United States Patent [19]

Murray et al.

[11] Patent Number: 5,721,891
[45] Date of Patent: Feb. 24, 1998

[54] DETECTION OF N LENGTH BIT SERIAL COMMUNICATION STREAM

[75] Inventors: Christopher Stephen Murray, Boynton Beach; Sonya Tyler Long, Coral Springs, both of Fla.

[73] Assignee: International Business Machines Corporation, Armonk, N.Y.

[21] Appl. No.: 572,936

[22] Filed: Dec. 15, 1995

[51] Int. Cl.$^6$ .................... G06F 1/14; G06F 3/00
[52] U.S. Cl. .................... 395/559; 395/557; 395/845; 395/852
[58] Field of Search .................. 395/551, 557, 395/558, 559, 200.17, 845, 849, 850, 852

[56] References Cited

U.S. PATENT DOCUMENTS

| | | | |
|---|---|---|---|
| 3,701,111 | 10/1972 | Cocke et al. | 340/172.5 |
| 3,873,920 | 3/1975 | Apple et al. | 325/41 |
| 4,616,211 | 10/1986 | Ross et al. | |
| 4,914,675 | 4/1990 | Fedele. | |
| 5,208,593 | 5/1993 | Tong et al. | |
| 5,220,325 | 6/1993 | Ackland etal. | |
| 5,363,097 | 11/1994 | Jan. | |
| 5,394,144 | 2/1995 | Kim. | |

*Primary Examiner*—Dennis M. Butler
*Attorney, Agent, or Firm*—Michael J. Buchenhorner; Richard A. Tomlin

[57] ABSTRACT

A method for communicating between two, or more, devices comprises the steps of (1) allocating, in a receiving device, a plurality of input buffers linked in a circular queue for continuous reading of data; (2) setting up a timer for determining the end of received data streams; (3) receiving a variable-length bit stream comprising data; synchronization of data; (5) determining whether data is being received upon expiration of the timer; (6) resynchronizing for a subsequent bit stream if not receiving data in step (5); (7) checking one of the plurality of input buffers for idle patterns if data is being received in step (5); (8) restarting the timer and returning to step (4), when idle patterns are not detected in step (7); and (9) disabling the receiver and resynchronizing and returning to step (4), when idle patterns are received in step (7).

11 Claims, 3 Drawing Sheets

DETECTION OF N LENGTH BIT SERIAL COMMUNICATION STREAM

FIELD OF THE INVENTION

This invention relates generally to communication protocols and more specifically to a communication protocol for communication between devices wherein unformatted unlimited-length serial bit streams are transmitted and received.

BACKGROUND OF THE INVENTION

In communication systems there are many digital communication devices (e.g., video systems) that transmit or receive variable length bit streams. However, some of these devices are unable to recognize bit or character oriented protocols. Most of these communication devices communicate by sending a start of frame for the communication chip (i.e., integrated circuit) in the receiving device to recognize the start of the information being sent. In bit synchronous protocols this is a flag (01111110). A flag is also received to terminate a stream of data. When a closing flag is received, the communication chip will stop looking for more data and begin looking for another flag. In character synchronous protocols it is a character agreed-upon by the devices communicating.

A problem exists for devices that are not able to recognize bit or character oriented protocols. Many devices receive variable length bit streams. The data is sent from a device as a variable-length bit stream. There is no parity, frame check sequence, or bit boundary. The amount of data to be received is unknown. There is no maximum boundary of the data format being sent. There is no trailing character in the bit stream to denote the end of the stream.

Another problem that exists with serial bit streams is that some devices stop the transmissions clock when the transmissions are complete and then re-start the clock when ready to transmit again. Other devices do not control the transmission clock and it runs continuously. This creates two problems.

(1) When the transmissions clock is stopped, the transmitter knows it is finished but the received does not.
(2) For transmitters that do not control the clock, when the transmissions are complete, the transmitter transmits idle patterns. The receiver always receives data. Some of this data includes idle patterns that are not desired. Accordingly, there is a need for a solution to these problems.

In a prior system, a sending device drops a control signal and the receiving device terminates a read on a change in the control signal. This method has the disadvantage that control signals are required to denote the termination of the received bit streams and some communication systems lack such control signals.

SUMMARY OF THE INVENTION

Briefly, in accordance with the invention, a method for communicating between two, or more, devices comprises the steps of (1) allocating, in a receiving device, a plurality of input buffers linked in a circular queue for continuous reading of data; (2) setting up a timer for determining the end of received data streams; (3) receiving a variable-length bit stream comprising data; synchronizing on the data received; (4) starting the timer on synchronization of data; (5) determining whether data is being received upon expiration of the timer; (6) resynchronizing for a subsequent bit stream if not receiving data in step (5); (7) checking one of the plurality of input buffers for idle patterns if data is being received in step (5); (8) restarting the timer and returning to step (4), when idle patterns are not detected in step (7); and (9) disabling the receiver and resynchronizing and returning to step (4), when idle patterns are received in step (7). Thus, the length of a message is determined by use of the timer.

BRIEF DESCRIPTION OF THE DRAWING(S)

DESCRIPTION OF THE ILLUSTRATIVE EMBODIMENT(S)

The invention provides a timer solution for detecting the end of a received bit stream that overcomes the problems discussed above. The first five to eight bits of a received data stream are known. In accordance with the invention, a character protocol is implemented to synchronize on the received bit pattern by these bits as a synchronization character. The end of the bit stream is more difficult to detect. Thus, also in accordance with the invention a timer is implemented to detect the end of the stream. The receiver allocates input buffers and links these in a circular queue. This allows data to be continuously read. The number and size of the buffers can be determined by the amount of memory available and the line speed of the link.

Figure 1:
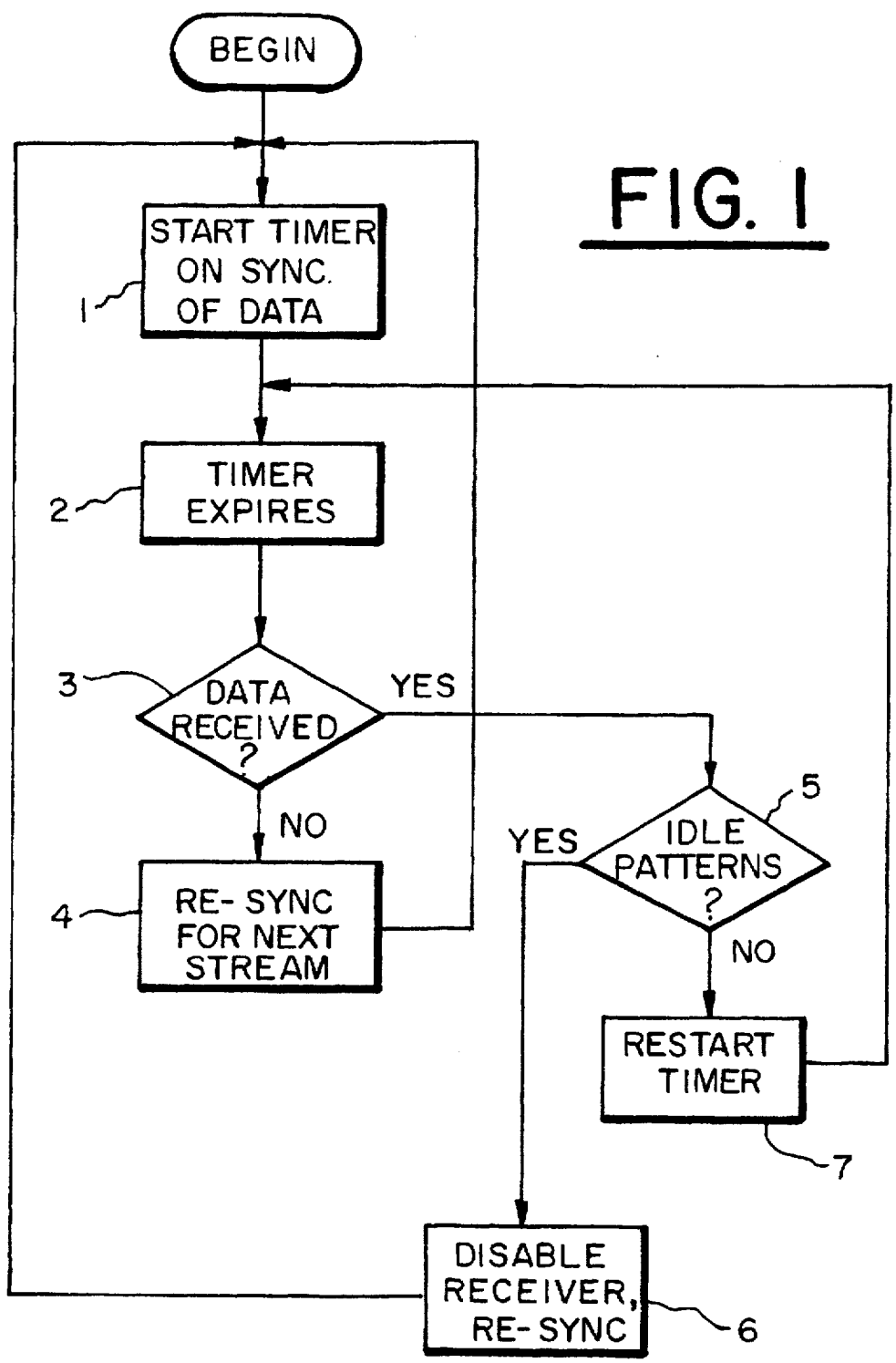
FIG. 1 shows a flow chart representing a method in accordance with the invention.

Referring to FIG. 1, there is shown a flow chart representing a method for communicating between two, or more, devices, in accordance with the invention. In accordance with the invention a timer is used to determine the lengths of incoming data streams. The method begins at step 1 by starting the timer on synchronization of incoming data. In step 2 the timer expires. A decision 3 is then made to determine whether data is being received upon expiration of the timer. If data is not being received, in step 4 resynchronization is done for the next bit stream and the process returns to step 1. If data is being received, the input buffers are checked for idle patterns in decision 5. When idle patterns are detected in step 5, the receiver is disabled, and resynchronizing is done. Then the process returns to step 1. If no idle patterns are found (i.e., good data), the timer is restarted in step 7 and the process returns to step 2.

For data received that is not on an eight-bit boundary, the data is received as eight bits and the remaining bits will be the state of the idle pattern. This method disables all cyclic redundancy checks (CRC), parity, and error checking on transmission and reception of data. The device is not able to recognize these features and therefore cannot transmit or receive data in this format.

Figure 2:
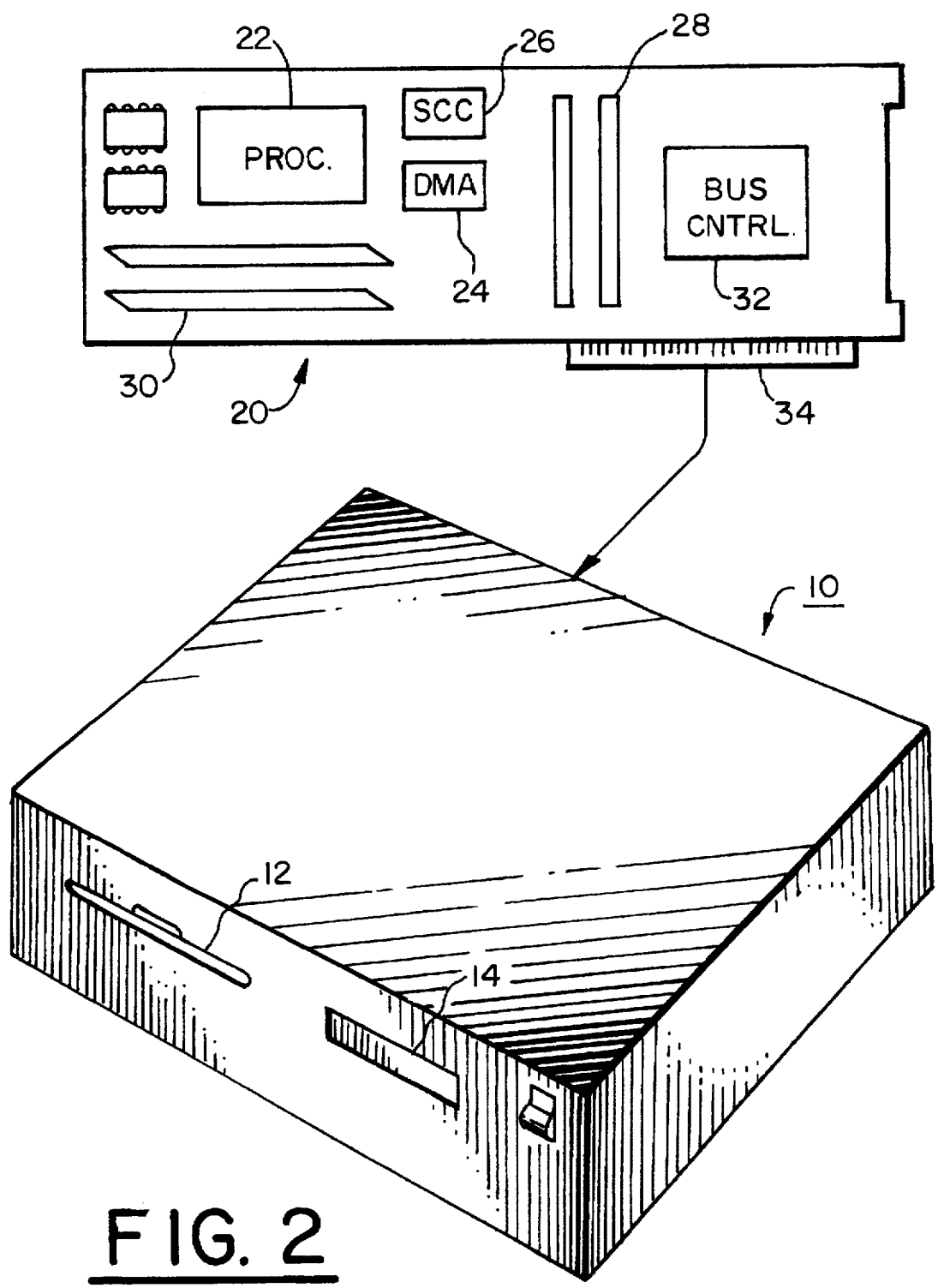
FIG. 2 shows a cutaway view of a personal computer (PC) system unit for implementing the method represented in FIG. 1.

Referring to FIG. 2, there is shown a conventional personal computer (pc) system unit 10 and a communication adapter 20 using a protocol in accordance with the invention. The pc unit 10 includes a diskette drive 12, a CD ROM drive 14, and a fixed disk drive (not shown) for providing mass information storage capability to the system.

The adapter 20 is a communication subsystem that is connectable to an expansion slot in the host pc unit 10 for coupling the system unit 10 to a communication network. The adapter is, in a sense, a computer within a computer and contains sufficient circuitry to offload the communication function from the central processor unit (cpu) of the system 10. Thus, the adapter 20 includes a processor 22 (e.g., an Intel 80960 microprocessor), a serial communication controller (SCC) 26, a direct memory access (DMA) controller 24, a bus controller 32, memory modules 30, and expansion slots 28. A connector 34 couples to an expansion slot on the motherboard of the system unit 10. The connector 34 can be designed in accordance with any of several expansion bus types such as Industry Standard Architecture (ISA) or Microchannel (a trademark of International Business Machines corporation).

The method of FIG. 1 can be implemented with the communication adapter 20 coupled with the host system 10. A set of input buffers can be created in the subsystem memory 30 and coupled in a circular queue to continuously receive incoming data streams. A timer in accordance with the invention can be implemented with any timer chip on the adapter card 20. One such timer can be found in the 80960 processor chip 22 under control of a device driver program for the adapter 20 (or by operating system software stored in the hard disk drive of the host system 10 and executed from a copy in RAM memory 30 on the card 20). Synchronization to incoming data streams can be accomplished with the SCC 26 programmed to detect an incoming bit stream and generate an interrupt (for the subsystem 20) in response.

Starting the timer is done by a timer circuit within the processor 22 controlled by the operating system program. Resynchronizing is done by the serial communications controller 26 controlled by the device driver to enable it to detect the incoming bit stream and synchronized thereto. Determining whether data is being received upon expiration of the timer is done by a pointer into the input buffers programmed to determine whether each of the input buffers contains data or idle patterns. Resynchronizing is done by a serial communication controller under control of the device driver program to detect an incoming bit stream and to generate an interrupt responsive to the incoming bit stream. Checking idle patterns is done with a pointer, pointing to the last byte received upon termination of a timer count. Restarting the timer is done with a timer circuit within the processor controlled by the operating system program and by restarting the timer circuit. Disabling the receiver and resynchronizing is done with the serial communications controller 26.

Figure 3:
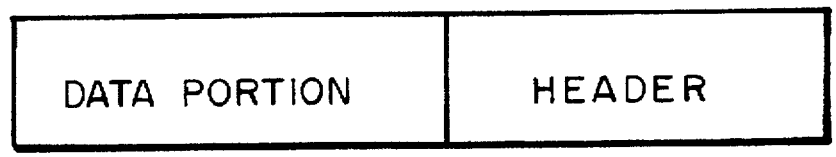
FIG. 3 shows a data packet in accordance with one aspect of the invention.

Referring to FIG. 3, there is shown a data packet for use with a protocol in accordance with the invention. The packet comprises a data portion and a header portion. The data portion represents the message being transmitted and is 1 to N bits in length. The header portion comprises synchronization information and is five to eight bits long. The synchronization bits may change for every frame and are variable in length, as is the frame. As discussed before, the length of the data portion is not known to the unit receiving the data because nothing in the packet indicates its length.

The system 10 (discussed with respect to FIG. 2) can be used as part of a communication system or network by coupling the communication adapter 20 to the system 10. The adapter 20 can be programmed to communicate with other devices in its network in accordance with a protocol according to the invention.

Figure 4:
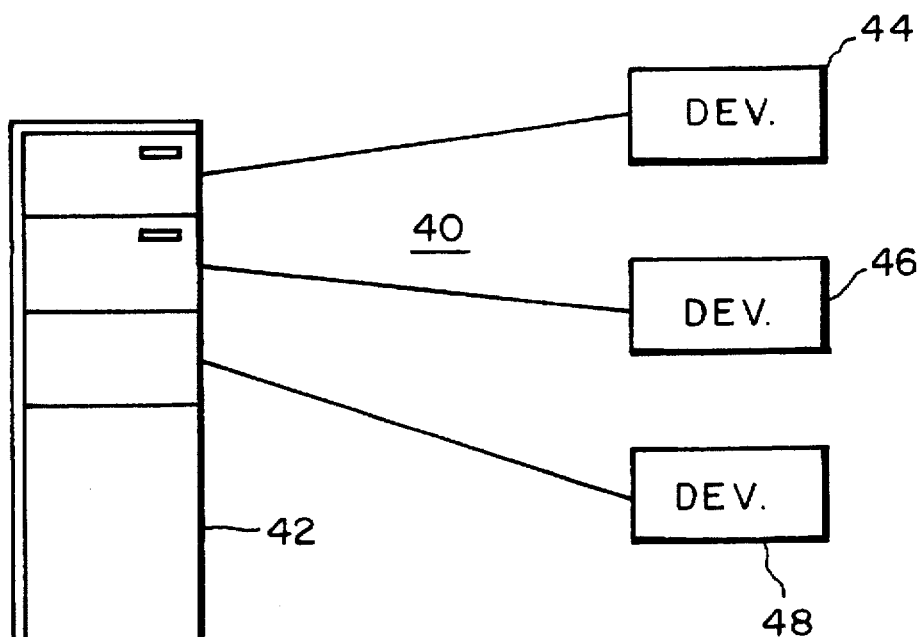
FIG. 4 shows a communication system comprising a computer unit and a plurality of devices coupled to the computer.

Referring to FIG. 4, there is shown a communication system 40 comprising a computer unit 42 and a plurality of devices (44-46) coupled to the computer 42. The communication subsystem or adapter 20 can be coupled to the computer 42 to provide operation in accordance with the invention. These devices represent a plurality of communication devices that may be used in a practical implementation of the invention. Assume that device 44 is an old device used to measure data and to transmit that data to another unit. In this system also assume that device 44 transmits variable-length bit streams having no parity, frame check sequence, or bit boundary. The receiving device (e.g., unit 42) receives the variable-length bit stream, decodes a predetermined number of bits (e.g., seven bits) in the variable-length bit stream to synchronize on the predetermined number of bits, using the predetermined number of bits as a synchronization character. The communication adapter 20 can be programmed to include a timer for determining the length of incoming bit streams.

What is claimed is:

1. A method for communicating between two, or more, devices comprising the steps of:

(1) allocating, in a receiving device, a plurality of input buffers linked in a circular queue for continuous reading of data;

(2) setting up a timer for determining the end of received data streams;

(3) receiving a variable-length bit stream comprising data; synchronizing on the data received;

(4) starting the timer synchronization of data;

(5) determining whether data is being received upon expiration of the timer;

(6) resynchronizing for a subsequent bit stream if not receiving data in step (5);

(7) checking one of the plurality of input buffers for idle patterns if data is being received in step (5);

(8) restarting the timer and returning to step (4), when idle patterns are not detected in step (7); and (9) disabling the receiver and resynchronizing and returning to step (4), when idle patterns are received in step (7).

2. A communication unit for receiving and transmitting data comprising:

a processor for processing instructions;

storage means coupled to the processor for storing instructions and data, said instructions comprising driver means;

a plurality of input buffers linked in a circular queue for continuous reading of data;

a timer for determining the end of received data streams;

means for receiving a variable-length bit stream comprising data;

means for synchronizing on the data received;

means for starting the timer on synchronization of data;

means for determining whether data is being received upon expiration of the timer;

means for resynchronizing for a subsequent bit stream if not receiving data;

means for checking one of the plurality of input buffers for idle patterns if data is being received;

means for restarting the timer when idle patterns are not detected; and means for disabling the receiver and resynchronizing when idle patterns are received.

3. The communication unit of claim 2 further comprising a direct memory access (DMA) controller and wherein the input buffers comprise memory means controlled by the DMA controller.

4. The communication unit of claim 2 wherein the timer comprises a timer circuit controlled by the operating system program.

5. The communication unit of claim 2 wherein the means for synchronizing comprises a serial communication controller under control of the device driver program to detect an incoming bit stream and to generate an interrupt responsive to the incoming bit stream.

6. The communication unit of claim 2 wherein the means for starting the timer comprises a timer circuit within the processor controlled by the operating system program.

7. The communication unit of claim 2 wherein the means for resynchronizing comprises a serial communications controller controlled by a device driver for the communication unit to enable it to detect the incoming bit stream and synchronized thereto.

8. The communication unit of claim 2 wherein the means for determining whether data is being received upon expiration of the timer comprises a pointer into the input buffers to determine each of the input buffers contains data or idle patterns.

9. The communication unit of claim 2 wherein the means for resynchronizing comprises a serial communication controller under control of a device driver for the communication unit to detect an incoming bit stream and to generate an interrupt responsive to the incoming bit stream.

10. The communication unit of claim 2 wherein the means for checking comprises a pointer for pointing to the last byte received upon termination of a timer count.

11. The communication unit of claim 2 wherein the means for restarting the timer comprises a timer circuit within the processor controlled by the operating system program and means for providing a reset command to the timer circuit.

* * * * *